(12) United States Patent
Akiyama

(10) Patent No.: US 6,721,090 B2
(45) Date of Patent: Apr. 13, 2004

(54) OPTICALLY AMPLIFIED GAIN CONTROL CIRCUIT AND OPTICALLY AMPLIFIED GAIN CONTROL METHOD

(75) Inventor: Kouiti Akiyama, Tokyo (JP)

(73) Assignee: NEC Corporation (JP)

( * ) Notice: Subject to any disclaimer, the term of this patent is extended or adjusted under 35 U.S.C. 154(b) by 112 days.

(21) Appl. No.: 10/026,248

(22) Filed: Dec. 19, 2001

(65) Prior Publication Data

US 2002/0080473 A1 Jun. 27, 2002

(30) Foreign Application Priority Data

Dec. 22, 2000 (JP) ........................................ 2000-391566

(51) Int. Cl.$^7$ ................................................ H01S 3/00
(52) U.S. Cl. ................................................... 359/341.3
(58) Field of Search ....................... 359/341.41, 341.42, 359/341.3

(56) References Cited

U.S. PATENT DOCUMENTS

| | | | | |
|---|---|---|---|---|
| 4,918,396 A | * | 4/1990 | Halemane et al. | 359/333 |
| 4,995,100 A | * | 2/1991 | Stallard et al. | 398/197 |
| 5,268,786 A | * | 12/1993 | Matsushita et al. | 359/341.33 |
| 5,461,497 A | * | 10/1995 | Mackichan | 398/181 |
| 5,483,233 A | * | 1/1996 | Pettitt et al. | 340/870.26 |
| 5,513,029 A | * | 4/1996 | Roberts | 398/32 |
| 5,563,731 A | * | 10/1996 | Asahi | 359/341.41 |
| 5,790,289 A | * | 8/1998 | Taga et al. | 398/79 |
| 6,023,366 A | * | 2/2000 | Kinoshita | 359/337.12 |
| 6,067,187 A | * | 5/2000 | Onaka et al. | 359/337.11 |
| 6,134,034 A | * | 10/2000 | Terahara | 398/1 |
| 6,160,649 A | * | 12/2000 | Horiuchi et al. | 398/34 |
| 6,483,630 B2 | * | 11/2002 | Kosaka | 359/337.11 |
| 6,556,325 B1 | * | 4/2003 | Horiuchi et al. | 359/177 |

FOREIGN PATENT DOCUMENTS

| | | | |
|---|---|---|---|
| JP | 04-078827 | 3/1992 | |
| JP | 04-284739 | 10/1992 | |
| JP | 6-260710 | 9/1994 | H01S/3/10 |
| JP | 7-154368 | 6/1995 | H04S/14/00 |
| JP | 9-321701 | 12/1997 | H04B/10/02 |
| JP | 2000-106464 | 4/2000 | |
| JP | 2000-307552 | 11/2000 | H04S/14/00 |
| JP | 2000-315982 | 11/2000 | H04B/10/08 |
| JP | 2000-353841 A | * 12/2000 | H01S/3/10 |

OTHER PUBLICATIONS

Japanese Office Action issed Feb. 18, 2003 (w/ English translation of relevant portion).

* cited by examiner

Primary Examiner—Thomas G. Black
Assistant Examiner—Deandra Hughes
(74) Attorney, Agent, or Firm—Dickstein, Shapiro, Morin & Oshinsky, LLP.

(57) ABSTRACT

An optically amplified gain control circuit is disclosed, which comprises an optically amplifying medium for amplifying an optical signal, a exciting light coupler for combining exciting light with the optical signal optically amplified by the optically amplifying medium, and a control circuit for controlling an output of the exciting light combined with the optical signal by the exciting light coupler, wherein the optical signal to be amplified is composed of a main signal, an SV signal, and a tone signal which are multiplexed, and wherein the control circuit controls the output of the exciting light corresponding to the tone signal on the preceding stage of the optically amplifying medium and the tone signal on the next stage of the optically amplifying medium so as to control the amplification of the optical signal by the optically amplifying medium.

4 Claims, 6 Drawing Sheets

OPTICALLY AMPLIFIED GAIN CONTROL CIRCUIT AND OPTICALLY AMPLIFIED GAIN CONTROL METHOD

BACKGROUND OF THE INVENTION

1. Field of the Invention

The present invention relates to an optically amplified gain control circuit and an optically amplified gain control method, and in particular, to those for controlling the gain of an optical amplifier.

2. Description of the Related Art

Conventionally, an optically amplified gain control circuit and an optically amplified gain control method are applied for an optical amplification of an optical communication system. Nowadays, as the Internet is becoming common at an explosive pace, it is necessary to drastically increase the transmission capacity of a backbone transmission system. As a means for increasing the transmission capacity effectively using the existing infrastructure, DWDM (Dense Wavelength Division Multiplexing) is becoming attractive. As a means for totally amplifying an optical signal that has been wavelength multiplexed, an optical amplifier is becoming important.

FIG. 1 shows an example of the structure of a conventional optical amplifier. In FIG. 1, an optical signal (composed of a main signal 101 and an SV signal 102) is input from a transmission path. The input optical signal is partly branched by a directional coupler 70. The branched optical signal is converted into an electric signal corresponding to the power of the input optical signal by a photoelectrically converting device 75. In addition, a part of an output of an optically amplifying medium 20 is branched by a directional coupler 74. A photoelectrically converting device 78 converts the output of the directional coupler 74 into an electric signal corresponding to the power of an output signal to the transmission path.

A control circuit 60 controls power of exciting light of a forward exciting light source 76 and a backward exciting light source 77 so as to control the output power to the transmission path to a predetermined value.

However, since the power of the optical signal on the transmission path varies corresponding to the number of signals that have been wavelength multiplexed, the output power to the transmission path should be varied corresponding to the number of multiplexed signals.

To do that, conventionally, a control circuit 60 superimposes a signal that represents the number of multiplexed wavelengths with the SV signal 102 so that a predetermined optical output power is transmitted to the transmission path corresponding to the number of multiplexed wavelengths.

However, in the related art reference, since the amplified gain of an optical amplifier is not flat in the amplification range, the optical power may not be optimally controlled depending on the position of the wavelength used as the main signal.

SUMMARY OF THE INVENTION

An object of the present invention is to provide an optically amplified gain control circuit and an optically amplified gain control method that allow the flatness of an amplification of a multiplexed signal to improve.

To accomplish the above-described object, the present invention is directed to an optically amplified gain control circuit, comprising an optically amplifying medium for amplifying an optical signal, a exciting light coupler for combining exciting light with the optical signal optically amplified by the optically amplifying medium, and a control circuit for controlling an output of the exciting light combined with the optical signal by the exciting light coupler, wherein the optical signal to be amplified is composed of a main signal, an SV signal, and a tone signal, which are multiplexed, and wherein the control circuit controls the output of the exciting light corresponding to the tone signal on the preceding stage of the optically amplifying medium and the tone signal on the next stage of the optically amplifying medium so as to control the amplification of the optical signal by the optically amplifying medium.

The output of the exciting light combined with the optical signal is controlled corresponding to the wavelength of the tone signal. The optically amplified gain control circuit further comprises two directional couplers for branching the optical signal so as to obtain the tone signal for controlling the output of the exciting light, wherein the directional couplers are disposed on the preceding stage of the optically amplifying medium and on the next stage of the optically amplifying medium. The optically amplified gain control circuit further comprises two band pass filters disposed on the preceding stage of the optically amplifying medium and on the next stage of the optically amplifying medium, for obtaining the tone signal from the optical signal branched by the directional couplers disposed on the preceding stage of the optically amplifying medium and the next stage of the optically amplifying medium. The wavelength of the tone signal is at nearly the center of the wavelength range of the optical signal.

These and other objects, features and advantages of the present invention will become more apparent in light of the following detailed description of a best mode embodiment thereof, as illustrated in the accompanying drawings.

DESCRIPTION OF PREFERRED EMBODIMENTS

Next, with reference to FIGS. 2 to 6, an optically amplified gain control circuit and an optically amplified gain control method according to the present invention will be described.

(First Embodiment)

Figure 1:
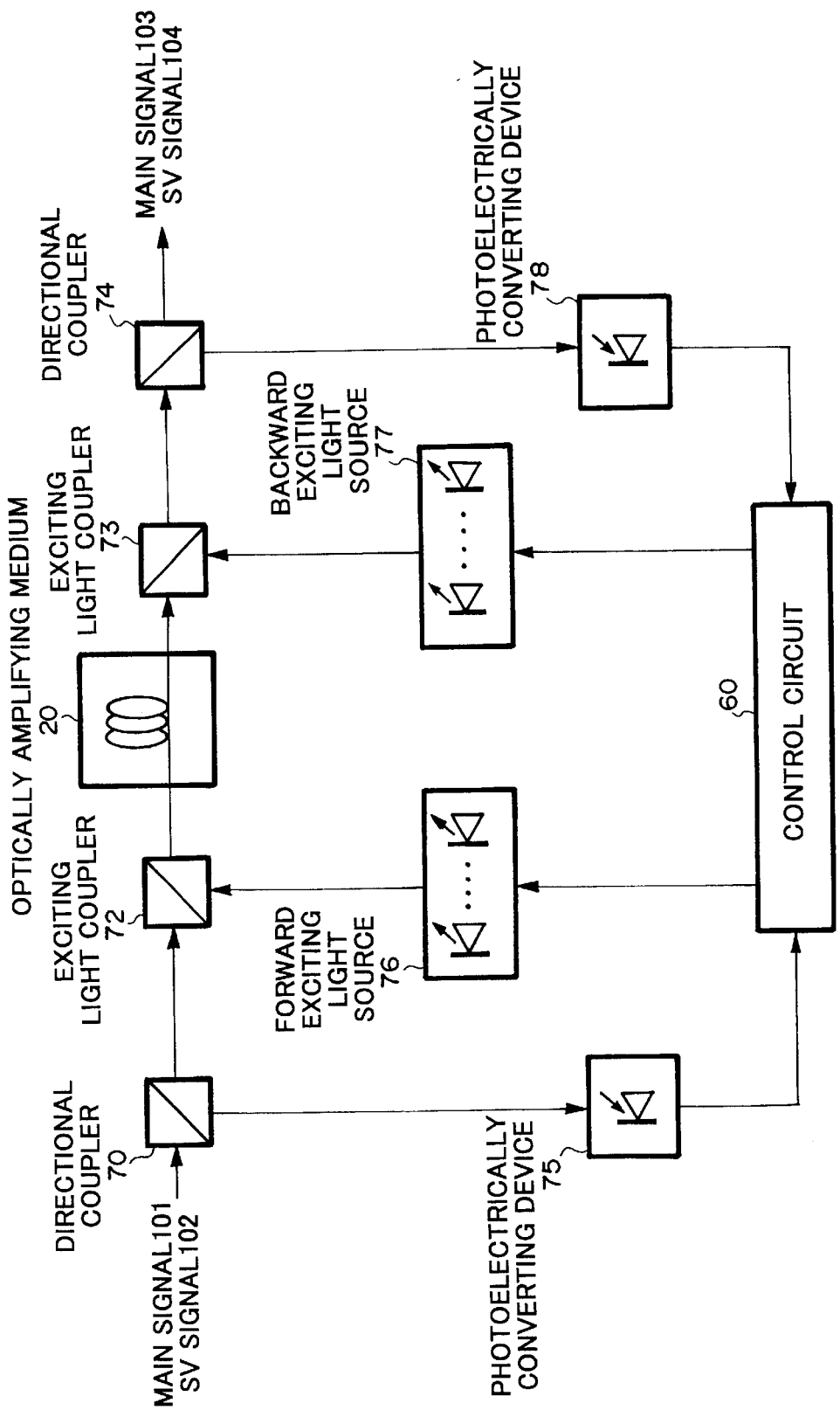
FIG. 1 is a block diagram showing an example of the structure of a conventional optical amplifier.
Figure 2:
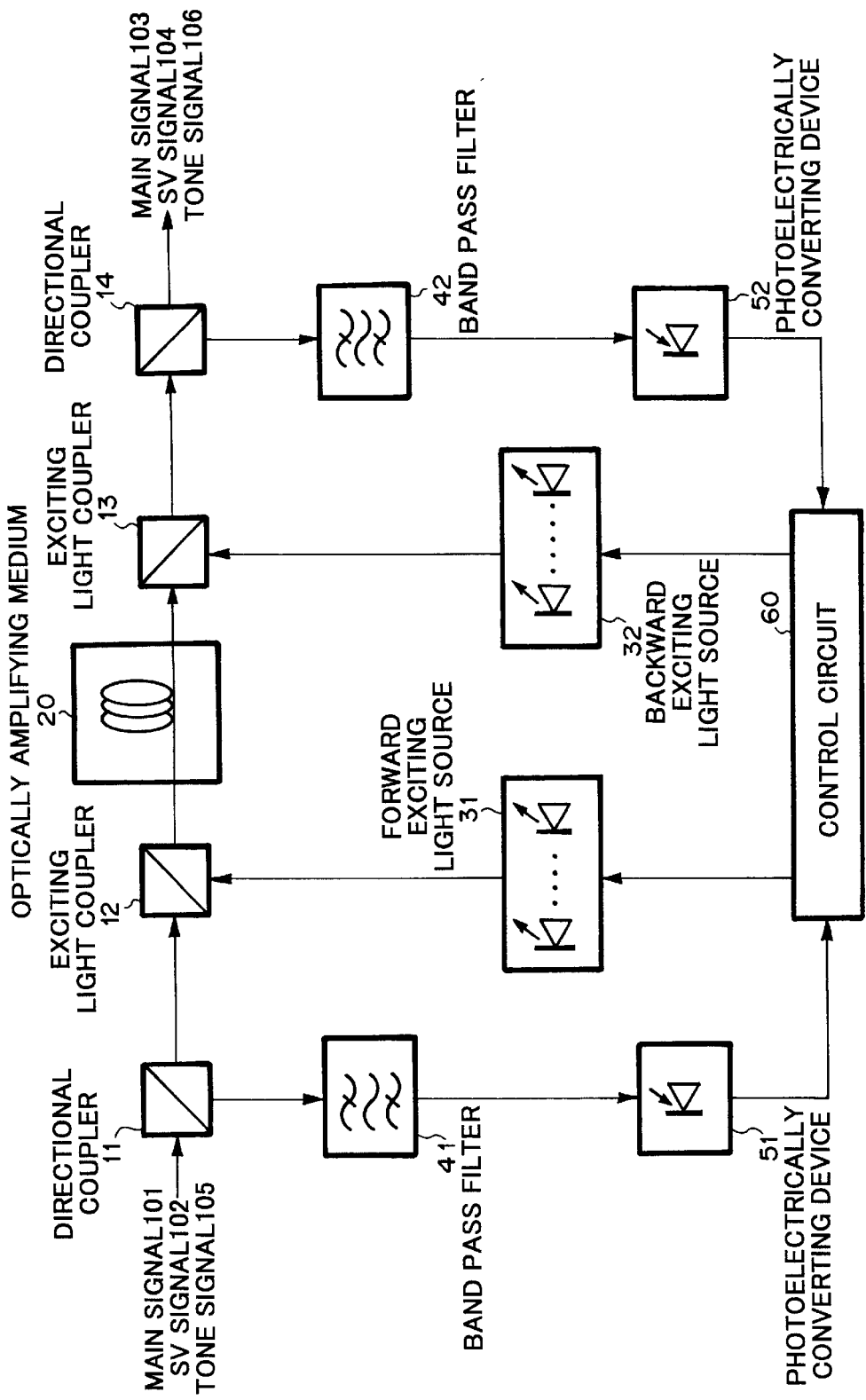
FIG. 2 is a block diagram showing an example of the structure of an optically amplified gain control circuit according to a first embodiment of the present invention.

FIG. 2 shows an example of the structure of an optically amplified gain control circuit according to a first embodiment of the present invention. The optically amplified gain control circuit according to the first embodiment has two directional couplers 11 and 14, two exciting light couplers 12 and 13, an optically amplifying medium 20, a forward exciting light source 31, a backward exciting light source 32, two band pass filters 41 and 42, two photoelectrically converting devices 51 and 52, and a control circuit 60. Input and output signals to and from the optically amplified gain control circuit according to the first embodiment are main signals 101 and 103, SV signals 102 and 104, and tone signals 105 and 106.

The directional coupler 11 branches an optical signal (composed of the main signal 101, the SV signal 102, and the tone signal 105) that is input from a transmission path (not shown) into an optical signal supplied to the exciting light coupler 12 and an optical signal supplied to the band pass filter 41. The exciting light coupler 12 combines the optical signal branched by the directional coupler 11 with exciting light that is output from the forward exciting light source 31. The exciting light coupler 13 combines an optical signal that is output from the optically amplifying medium 20 with exciting light that is output from the backward exciting light source 32. The directional coupler 14 branches an optical signal that is output from the exciting light coupler 13 into an optical signal supplied to the transmission path (not shown) and an optical signal that is supplied to the band pass filter 42. The optically amplifying medium 20 amplifies the optical signal.

The forward exciting light source 31 is composed of one or a plurality of exciting light sources. The exciting light source is controlled by the control circuit 60. Likewise, the backward exciting light source 32 is composed of one or a plurality of exciting light sources. The exciting light source is controlled by the control circuit 60. The band pass filter 41 extracts a tone signal from the optical signal branched by the directional coupler 11. The band pass filter 42 extracts a tone signal from the optical signal branched by the directional coupler 14.

The photoelectrically converting device 51 converts an output signal of the band pass filter 41 into an electric signal. Likewise, the photoelectrically converting device 52 converts an output signal of the band pass filter 42 into an electric signal. The control circuit 60 compares the electric signal corresponding to the input power of the pre-amplified optical signal that is output from the photoelectrically converting device 51 and the electric signal corresponding to the output power of the amplified optical signal that is output from the photoelectrically converting device 52 and controls the output powers of the forward exciting light source 31 and the backward exciting light source 32 so that a predetermined gain is kept.

According to the first embodiment, the optically amplifying medium 20 is excited by the forward exciting light source 31 on the input side of the optically amplifying medium 20 and by the backward exciting light source 32 on the output side of the optically amplifying medium 20. Alternatively, the optically amplifying medium 20 may be excited by either the forward exciting light source 31 or the backward exciting light source 32.

Figure 3:
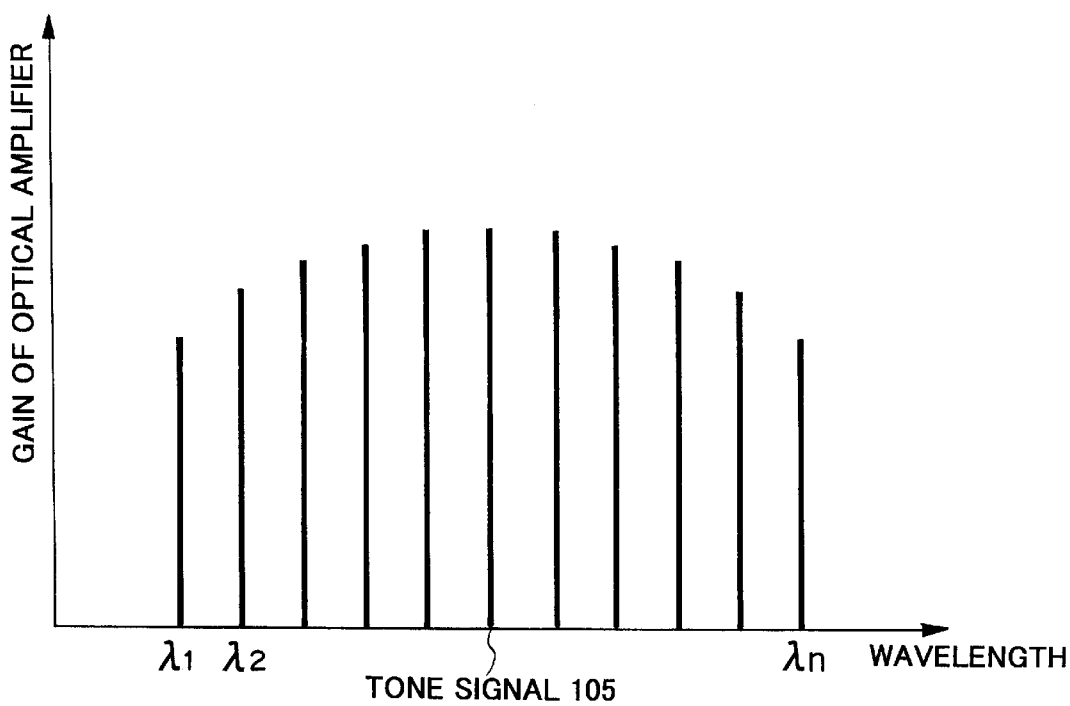
FIG. 3 is a graph showing the relation between a wavelength of an optical signal and a gain of an optical amplifier.

FIG. 3 shows the relation between a wavelength of an optical signal and a gain of an optical amplifier. The tone signal 105 may be inserted into any position of the wavelength range. However, in consideration of the case that the frequency characteristic in the band of the optical amplifiers is not flat, it is preferred to insert the tone signal 105 at nearly the center position of the wavelength range. "Tone signal 105" shown in FIG. 3 represents an example of a desired position.

(Example of Operation)

Next, with reference to FIG. 2, the operation of the first embodiment of the present invention will be described. An optical signal that is input from a transmission path (not shown) is wavelength multiplexed with the main signal 101 transmitted with a plurality of wavelengths, the SV signal 102 as a supervisory signal with a wavelength different from the wavelength of the main signal 101, and the tone signal 105 with a wavelength different from the wavelengths of the main signal 101 and the SV signal 102. The SV signal 102 and the tone signal 105 are wavelength multiplexed with the main signal 101 in a terminal station (not shown).

The optical signal (compose of the main signal 101, the SV signal 102, and the tone signal 105) that is input from the transmission path (not shown) is partly input to the band pass filter 41 by the directional coupler 11. After the tone signal 105 is extracted from the optical signal by the band pass filter 41, the tone signal 105 is converted into an electric signal by the photoelectrically converting device 51.

On the one hand, the rest of the optical signal branched by the directional coupler 11 is combined with exciting light that is output from the forward exciting light source 31 by the exciting light coupler 12 on the input side of the optically amplifying medium 20. The optically amplifying medium 20 is excited by the combined signal. On the other hand, exciting light that is output from the backward exciting light source 32 is combined with the optical signal by the exciting light coupler 13 on the output side of the optically amplifying medium 20. The optically amplifying medium 20 is excited by the combined signal.

The optical signal amplified by the optically amplifying medium 20 is branched by the directional coupler 14 and partly input to the band pass filter 42. The band pass filter 42 extracts the tone signal 105 from the optical signal. Thereafter, the photoelectrically converting device 52 converts the tone signal 105 into an electric signal.

The control circuit 60 compares the electric signal corresponding to the input power of the pre-amplified optical signal that is output from the photoelectrically converting device 51 and the electric signal corresponding to the output power of the amplified optical signal that is output from the photoelectrically converting device 52 and controls the output powers of the forward exciting light source 31 and the backward exciting light source 32 so that a predetermined gain is kept.

Although the tone signal 105 may be inserted into any position of the wavelength range, as shown in FIG. 3, in consideration of the case that the frequency characteristic of the band of the optical amplifier is not flat, it is preferred to insert the tone signal 105 at nearly the center of the wavelength range.

According to the first embodiment, an optical signal of which a main signal and a tone signal are wavelength multiplexed is input from a terminal station (not shown). The power of the tone signal at the input end of the optical amplifier and the power of the tone signal at the output end of the optical amplifier are compared. Thus, regardless of the number of multiplexed wavelengths, the gain of the optical amplifier can be controlled to a predetermined value.

(Second Embodiment)

Figure 4:
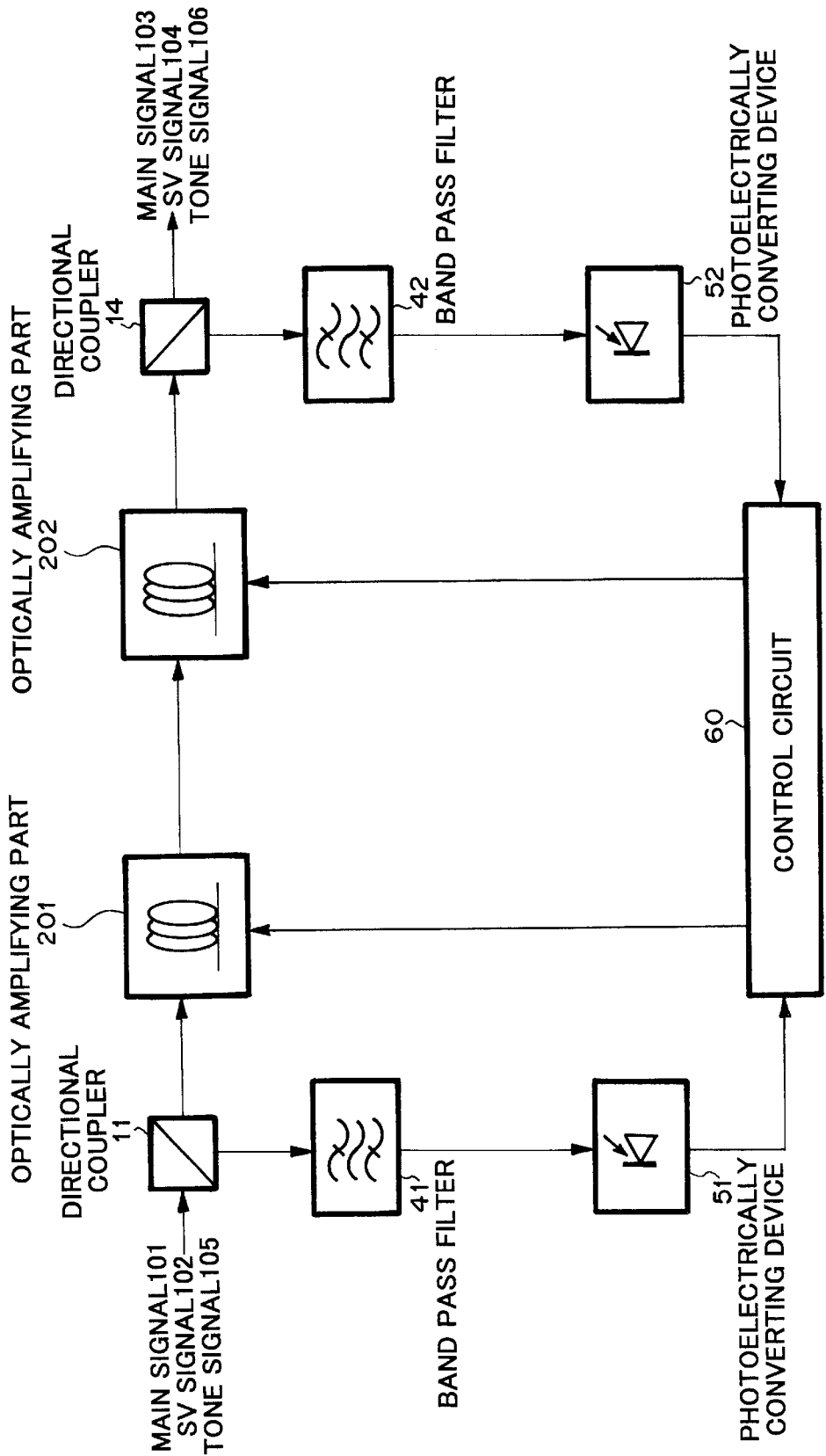
FIG. 4 is a block diagram showing an example of the structure of an optically amplified gain control circuit according to a second embodiment of the present invention.
Figure 5:
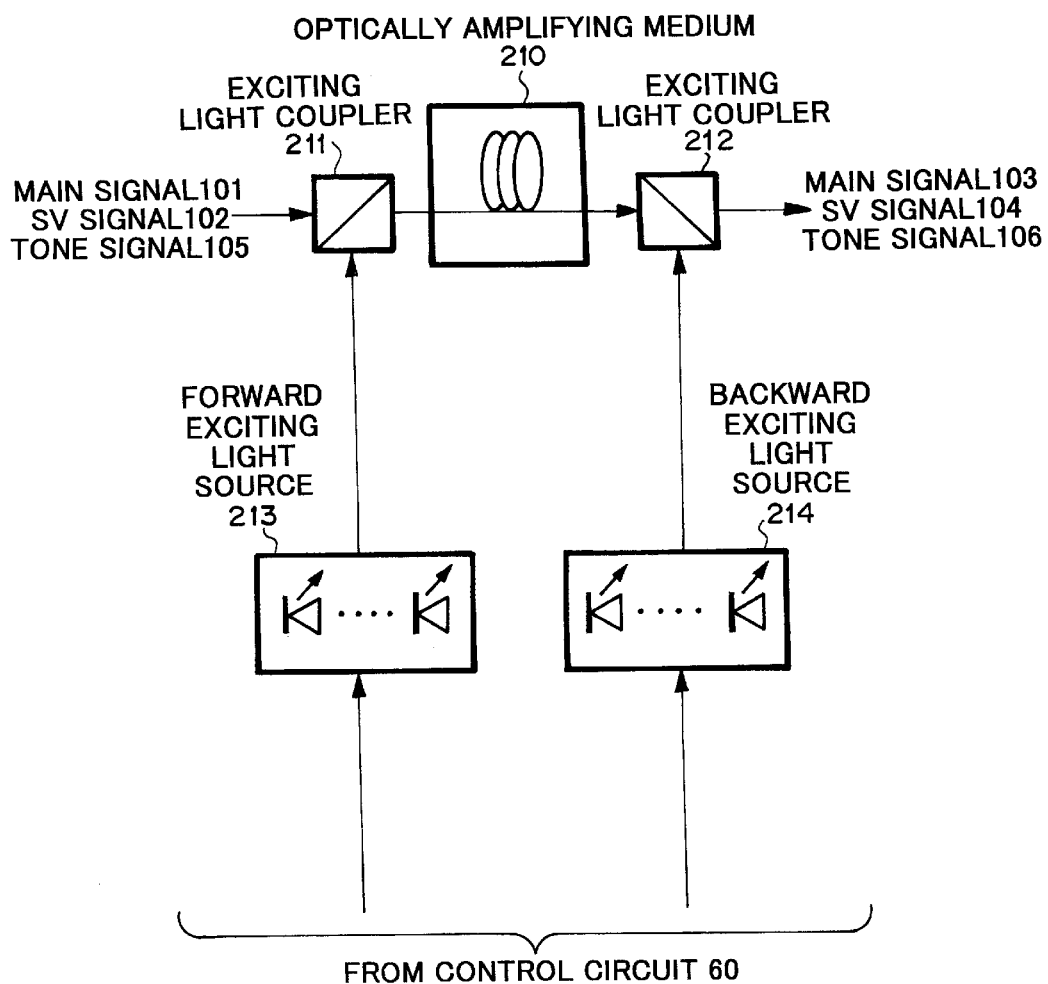
FIG. 5 is a block diagram showing another example of the structure of optical amplifying parts 201 and 202 shown in FIG. 4.

FIG. 4 is a block diagram showing an example of the structure of an optically amplified gain control circuit according to a second embodiment of the present invention. FIG. 5 shows an example of the structure of optically amplifying parts 201 and 202 in detail. According to the second embodiment, an optical signal is amplified by a plurality of optically amplifying parts shown in FIG. 4 that are composed of structural parts shown in FIG. 5. According to the second embodiment, the optically amplifying part 201 shown in FIG. 4 is composed of for example a exciting light coupler 211, a forward exciting light source 213, a exciting light coupler 212, and a backward exciting light source 214.

The exciting light coupler 211 combines an optical signal (composed of the main signal 101, the SV signal 102, and the tone signal 105) with exciting light that is output from the forward exciting light source 213. The forward exciting light source 213 is composed of one or a plurality of exciting light sources. An optically amplifying medium 210 amplifies an optical signal.

The exciting light coupler 212 combines an optical signal that is output from the optically amplifying medium 210 with exciting light that is output from the backward exciting light source 214. The backward exciting light source 214 is composed of one or a plurality of exciting light sources.

As with the first embodiment, in the optically amplified gain control circuit according to the second embodiment, the optically amplifying medium 210 is excited on the input side thereof by the forward exciting light source 213 and on the output side thereof by the backward exciting light source 214. Alternatively, the optically amplifying medium 210 may be excited by either the forward exciting light source 213 or the backward exciting light source 214. The structure of the optically amplifying part 202 is the same as the structure of the optically amplifying part 201.

(Third Embodiment)

Figure 6:
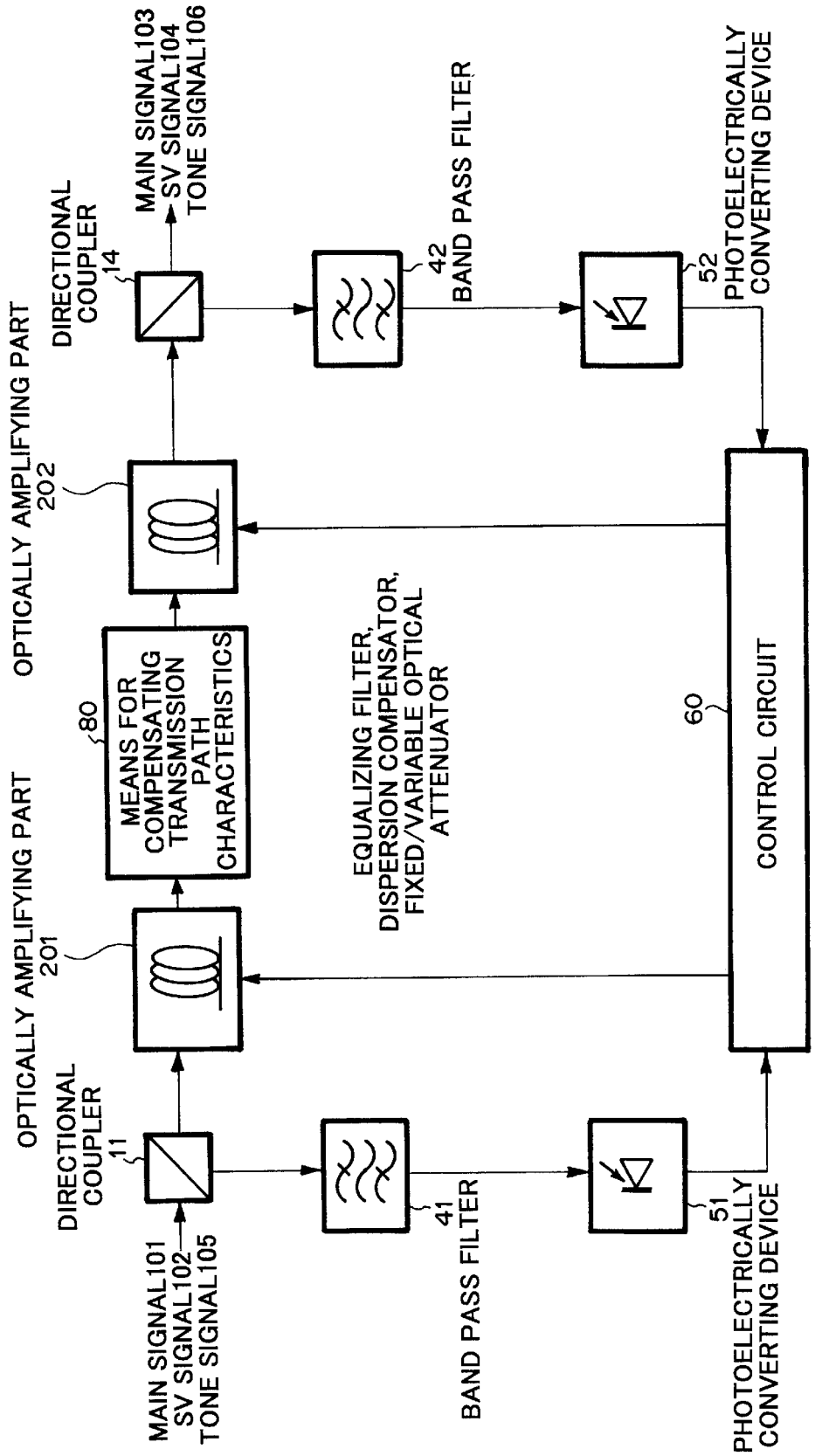
FIG. 6 is a block diagram showing an example of the structure of an optically amplified gain control circuit according to a third embodiment of the present invention.

FIG. 6 is a block diagram showing an example of the structure of an optically amplified gain control circuit according to a third embodiment of the present invention. According to the third embodiment, a means for compensating transmission path characteristics 80 is disposed in the structure according to the second embodiment. Thus, the difference between the structure according to the third embodiment and the structure according to the second embodiment is whether or not the means for compensating transmission path characteristics 80 is disposed.

The means for compensating transmission path characteristics 80 is for example an equalizing filter or a dispersion compensation fiber. When the means for compensating transmission path characteristics 80 is disposed in an optical amplifier, the loss of the transmission path can be compensated. In addition, a fixed optical attenuator or a variable optical attenuator that adjusts optical output signals of the optical amplifiers 201 and 202 or an optical output signal of all the optical amplifiers may be disposed.

According to each of the above-described embodiments, in DWDM (Dense Wavelength Division Multiplexing), a main signal and a tone signal have different wavelengths. By monitoring the optical power of the tone signal, the gain of an optical amplifier is controlled.

The above-described embodiments are just examples of a preferred embodiment of the present invention. However, the present invention is not limited to such embodiments. In other words, without departing from the scope of the present invention, a varieties of modified embodiments are available.

As is clear from the above description, in the optically amplified gain control circuit and the optically amplified gain control method according to the present invention, a main signal, an SV signal, and a tone signal are multiplexed and thereby an optical signal to be optically amplified is formed. The formed optical signal is branched into two ways. One-branched optical signal is combined with exciting light. The combined signal is amplified. The amplified optical signal is branched into two ways. One-branched optical signal is treated as an amplified output signal. An output of exciting light is controlled corresponding to a tone signal extracted from the other-branched signal on the preceding stage and a tone signal extracted from the other-branched optical signal on the next stage. Thus, regardless of the number of multiplexed wavelengths, the gain of an optical amplifier can be controlled to a predetermined value.

Although the present invention has been shown and described with respect to preferred embodiments thereof, it should be understood by those skilled in the art that the foregoing and various other changes, omissions, and additions in the form and detail thereof may be made therein without departing from the spirit and scope of the present invention.

What is claimed is:

1. An optically amplified gain control circuit, comprising:

an optically amplifying medium for amplifying an optical signal;

an exciting light coupler for combining exciting light with the optical signal optically amplified by said optically amplifying medium; and a control circuit for controlling an output of the exciting light combined with the optical signal by said exciting light coupler, wherein the optical signal to be amplified is composed of a main signal, an SV signal, and a tone signal, which are multiplexed, and wherein said control circuit controls the output of said exciting light coupler based upon a comparison of the tone signal at an input stage of said optically amplifying medium and the tone signal at an output stage of said optically amplifying medium so as to control the amplification of the optical signal by said optically amplifying medium, wherein the wavelength of the tone signal is at nearly the center of the wavelength range of the optical signal.

2. The optically amplified gain control circuit as set forth in claim 1, further comprising: two directional couplers for branching the optical signal so as to obtain the tone signal for controlling the output of the exciting light, wherein said directional couplers are disposed at the input stage of said optically amplifying medium and on the output stage of said optically amplifying medium.

3. The optically amplified gain control circuit as set forth in claim 2, further comprising: two band pass filters disposed at the input stage of said optically amplifying medium and at the output stage of said optically amplifying medium, for obtaining the tone signal from the optical signal branched by said directional couplers disposed at the input stage of said optically amplifying medium and the output stage of said optically amplifying medium.

4. An optically amplified gain control method, comprising the steps of:

(a) multiplexing a main signal, an SV signal, and a tone signal so as to form an optical signal to be optically amplified;

(b) branching said optical signal into two ways so as to form a one-branched optical signal and an other-branched optical signal;

(c) combining exciting light with the one-branched optical signal to form a combined optical signal;

(d) amplifying the combined optical signal;

(e) branching the amplified combined optical signal into two ways so as to form a one-branched combined optical signal and an other branched combined optical signal and treating the one-branched combined optical signal as an amplified output signal; and (f) controlling an output of the exciting light based on a comparison between the tone signal extracted from the other-branched optical signal branched at the first optical signal branching step (b) and the tone signal extracted from the other-branched combined optical signal branched at the second optical signal branching step (e), wherein the wavelength of the tone signal is at nearly the center of the wavelength range of the optical signal.

* * * * *